(12) United States Patent
Lee et al.

(10) Patent No.: US 10,719,780 B2
(45) Date of Patent: Jul. 21, 2020

(54) EFFICIENT MACHINE LEARNING METHOD

(71) Applicant: DRVision Technologies LLC, Bellevue, WA (US)

(72) Inventors: Shih-Jong James Lee, Bellevue, WA (US); Michael William Jones, Kenmore, WA (US)

(73) Assignee: DRVISION TECHNOLOGIES LLC, Bellevue, WA (US)

( * ) Notice: Subject to any disclaimer, the term of this patent is extended or adjusted under 35 U.S.C. 154(b) by 754 days.

(21) Appl. No.: 15/475,611

(22) Filed: Mar. 31, 2017

(65) Prior Publication Data
US 2018/0285771 A1 Oct. 4, 2018

(51) Int. Cl.
*G06N 20/00* (2019.01)
(52) U.S. Cl.
CPC ................ *G06N 20/00* (2019.01)
(58) Field of Classification Search
CPC ....................................... G06N 20/00
See application file for complete search history.

(56) References Cited

PUBLICATIONS

Leng et al., "Combining active learning and semi-supervised learning to construct SVM classifier", May 2013, Knowledge-Based Systems, vol. 44, pp. 121-131 (Year: 2013).*
Zhou et al., "When Semi-Supervised Learning Meets Ensemble Learning", 2009, International Workshop on Multiple Classifier Systems, pp. 1-11 (Year: 2009).*
Samiappan et al., "Semi-Supervised Co-Training and Active Learning Framework for Hyperspectral Image Classification", Nov. 12, 2015, 2015 IEEE International Geoscience and Remote Sensing Symposium (IGARSS), pp. 401-404 (Year: 2015).*
Bouguelia et al., "Efficient Active Novel Class Detection for Data Stream Classification", Dec. 8, 2014, 2014 22nd International Conference on Pattern Recognition, pp. 2826-2831 (Year: 2014).*

* cited by examiner

*Primary Examiner* — Robert A Cassity
*Assistant Examiner* — Brent Johnston Hoover
(74) *Attorney, Agent, or Firm* — Pai Patent & Trademark Law Firm; Chao-Chang David Pai (57) ABSTRACT

A computerized efficient machine learning method for classification of data and new class discovery inputs labeled data and unlabeled data into a computer memory for a computerized machine tool to perform (a) initial supervised learning using the labeled data to generate a classifier, (b) semi-supervised learning using the labeled data, the classifier and the unlabeled data to generate an updated classifier and high confidence data, (c) active learning using the updated classifier and the unlabeled data to generate a data label request and receive new class labeled data to generate augmented labeled data, (d) new class discovery using the updated classifier and the data label request to generate data of potential new classes and receive labels for potential new class data to generate new class labeled data, and (e) supervised learning using the high confidence data, the labeled data and the augmented labeled data to generate an output classifier.

25 Claims, 4 Drawing Sheets

EFFICIENT MACHINE LEARNING METHOD

STATEMENT AS TO RIGHTS TO INVENTIONS MADE UNDER FEDERALLY SPONSORED RESEARCH AND DEVELOPMENT

This work was supported by U.S. Government grant number 1R44NS097094-01A1, awarded by the NATIONAL INSTITUTE OF NEUROLOGICAL DISORDERS AND STROKE. The U.S. Government may have certain rights in the invention.

BACKGROUND OF THE INVENTION

Field of the Invention

The present invention relates to computer machine learning and, more particularly, to computerized efficient machine learning method for classification of data and new class discovery.

Description of the Related Art a. Description of Problem that Motivated Invention.

In computerized machine learning applications, to learn a reliable model usually requires plenty of digital labeled data. However, digital labeled data are expensive and scarce. In many real-world applications, it is relatively easy to acquire a large amount of unlabeled data. For example, documents can be crawled from the web, images can be obtained from surveillance cameras, microscopy experiments, and speech can be collected from broadcast. However, their corresponding labels for the prediction task, such as sentiment orientation, intrusion detection, biomarker phenotypes, and phonetic transcript, often requires slow human annotation and expensive laboratory experiments. This labeling bottleneck results in a scarce of digital labeled data and a surplus of digital unlabeled data. Therefore, being able to utilize the surplus digital unlabeled data for learning is desirable. There is generally a need to learn faster, better, and cheaper.

Collecting and preparing the data and their labels are often the most important steps in solving a computerized machine learning problem. The example data should be representative of the digital data that you will have when you are using the model to make a prediction. For example, if you want to predict whether an email is spam or not, you must collect both positive (spam emails) and negative (non-spam emails) for the computerized machine learning algorithm to be able to find patterns that will distinguish between the two types of email. Furthermore, in discovery applications, the classes of labeling may not be known in advance. For example, the phenotypes of biomarkers for diseases such as cancers or neurological degenerative diseases may not be known or only partially known. It is desirable to have a method and computer guided tool to assist the discovery of new labeling classes.

b. How Did Prior Art Solve Problem?

The prior art semi-supervised learning devises ways of utilizing unlabeled data with labeled data to learn better models. The history of semi-supervised learning goes back to at least the 70s, when self-training, transduction, and Gaussian mixtures with the EM algorithm first emerged. It enjoyed an explosion of interest since the 90s, with the development of new algorithms like co-training and trans-ductive support vector machines, new applications in natural language processing and computer vision, and new theoretical analyses.

However, semi-supervised learning relies on models. A wrong model assumption leading to the learning of wrong labels could cause significant problems, worse than the original learning using only labeled data. There is no guarantee that if one have labeled and unlabeled data, one should do at least as well as only having the labeled data.

The prior art active learning method aims to make machine learning more economical, since they can participate in the acquisition of their own training data. An active learner might iteratively select informative query instances to be labeled by an oracle. Work over the last two decades has shown that such approaches are effective at maintaining accuracy while reducing training set size in many machine learning applications. However, as active learning is deployed in real applications, problems are encountered due in part to practical realities that violate the basic assumptions of earlier foundational work. For example, many of the query images generated by the learner contained no recognizable symbols, only artificial hybrid characters that had no semantic meaning.

BRIEF SUMMARY OF THE INVENTION

The primary objective of this invention is to provide a computerized machine learning method that can efficiently learn to reach good performance with a small number of labeled data. The secondary objective of the invention is to provide a computerized machine learning method that can efficiently guide the discovery of new classes. The third objective of the invention is to provide an integrated learning method that can refine the learning model for utilizing unlabeled data. The fourth objective of the invention is to allow a labeler to effectively control the learning process through labels of the requested data. The fifth objective of the invention is to select from unlabeled data the high confidence data and create augmented labeled data for new classifier learning.

The current invention integrates semi-supervised learning and active learning in an iterative fashion. This allows conservative model assumption of the semi-supervised learning and the benefit of labeler feedback from active learning for the semi-supervised learning model refinement. The active learning requests not only the labels of uncertain data but also some supposedly high confidence data based on the semi-supervised learning model assumption. If the high confidence data is not confirmed, the semi-supervised learning model assumption can be updated.

Furthermore, a new class discovery module of the current invention specifically searches for novel data that could be from unexpected or new classes for labeler confirmation. This uniquely enables the new class discovery. The semi-supervised learning, active learning and new discovery can be integrated and iterated until a stable state is reached. That is, semi-supervised learning enhances the learning maturity, active learning allows labeler to verify the selected high confidence data or provide feedback to update the semi-supervised learning model. Active learning also allows the clarification of the low confidence data. The discovery module allows new class hypothesis and test to guide the identification and insight of the new classes.

The current invention uniquely facilitates efficient learning for a high-performance classifier and the discovery of new classes.

BRIEF DESCRIPTION OF THE DRAWINGS

The following detailed description of the preferred embodiments of the present invention can best be understood when read in conjunction with the following drawings, in which.

DETAILED DESCRIPTION OF THE PREFERRED EMBODIMENTS

Figure 1:
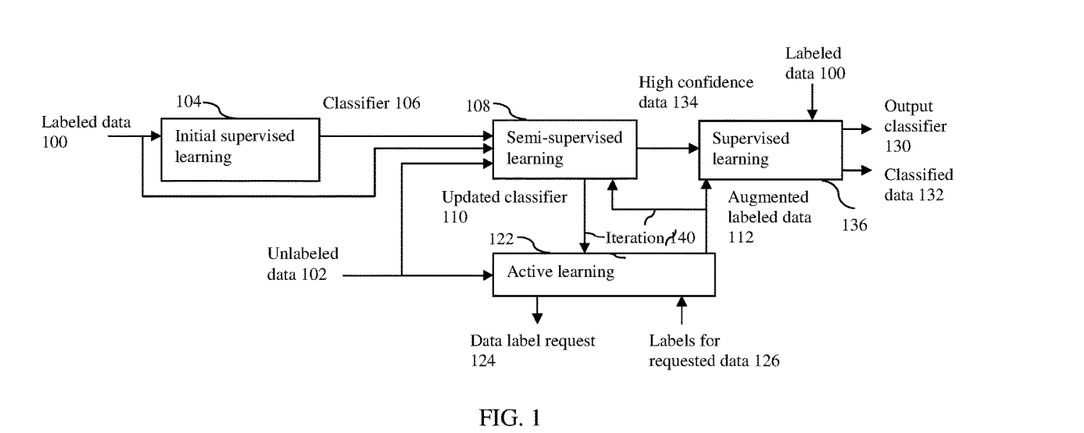
FIG. 1 shows the processing flow of the efficient machine learning method according to the present application.
Figure 2:
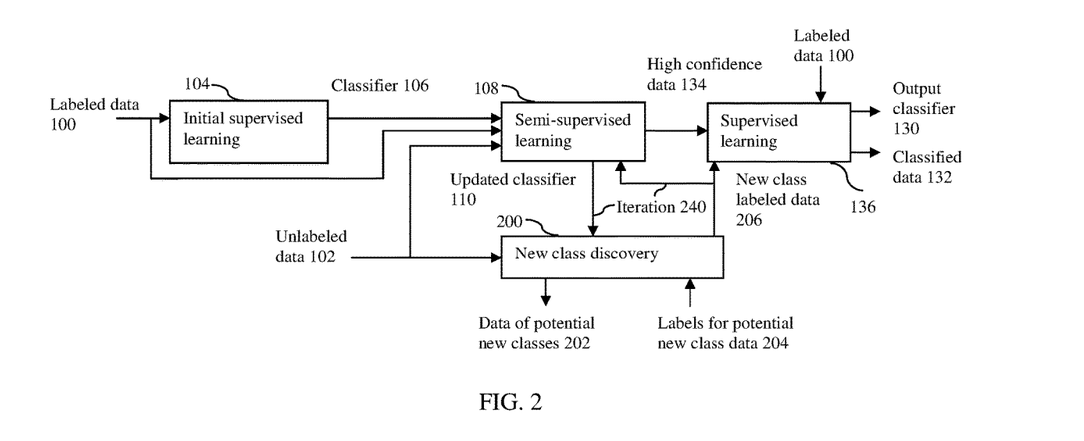
FIG. 2 shows the processing flow of an alternative embodiment of the efficient machine learning method according to the present application.
Figure 3:
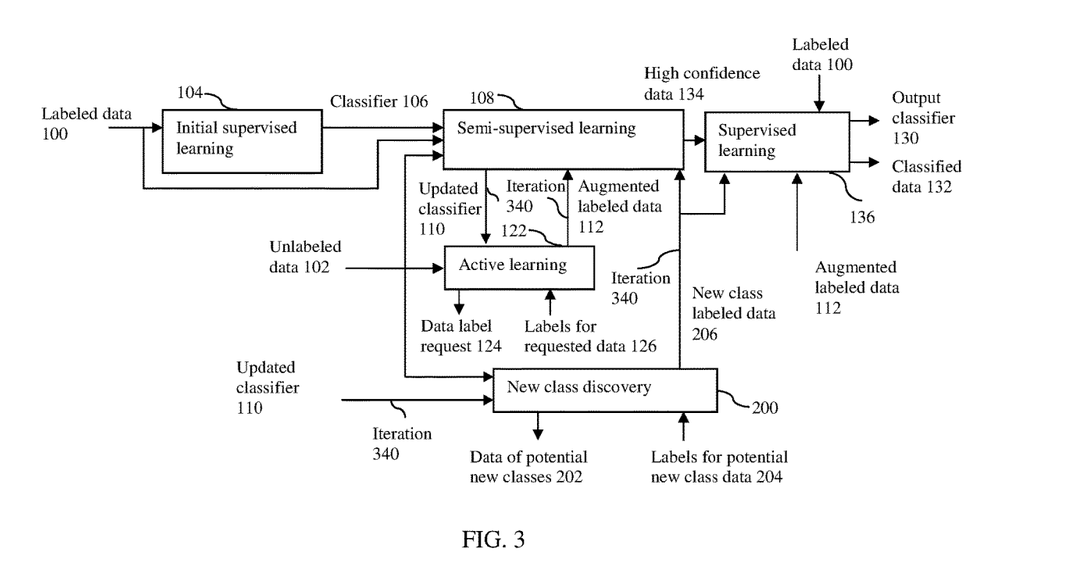
FIG. 3 shows the processing flow of a second alternative embodiment of the efficient machine learning method according to the present application.

The preferred embodiments of the present invention will be described in detail below.
1. Concept
I. Application Scenarios The application scenarios of the computerized efficient machine learning method of the current invention are shown in FIG. 1 to FIG. 3. FIG. 1 shows the processing flow of one embodiment of the efficient machine learning method. An input set of labeled data 100 and unlabeled data 102 are loaded into computer memory. The initial supervised learning module 104 executed by a computer program of a computerized machine learning tool processes the labeled data 100 to produce a classifier 106. The labeled data 100, the unlabeled data 102, and the classifier 106 are processed by the semi-supervised learning module 108 executed by a computer program of the computerized machine learning tool to produce an updated classifier 110 which is learnt from both the labeled data 100 and the unlabeled data 102. In addition, the semi-supervised learning module 108 also identifies high confidence data 134 from the unlabeled data 102 whose label can be inferred based upon the labeled data 100 and the classifier 106. In one embodiment of the invention, the updated classifier 110 and the unlabeled data 102 are processed by the active learning module 122 executed by a computer program of the machine learning tool, which identifies an uncertain or unusual subset of the unlabeled data 102 as well as samples of the high confidence data 134 for validation and requests labels from a labeler in the form of a data label request 124. The labeler determines the labels for the unlabeled data in the data label request 124 and returns the labels for requested data 126 including labels for the samples of the high confidence data. The active learning module 122 combines the labels for requested data 126 with the uncertain unlabeled data and sampled high confidence data identified in the data label request 124 to produce the augmented labeled data 112.

In one embodiment of the invention the augmented label data 112 is returned to the semi-supervised learning module 108 where the cycle between the semi-supervised learning module 108 and the active learning module 122 can repeat through iteration 140 until a stopping criterion is met. Afterwards, the high confidence data 134, labeled data 100, and augmented labeled data 112 are processed by the supervised learning module 136 to produce an output classifier 130 and classified data output 132. In one embodiment of the invention, the stopping criteria is selected from a set consisting of 1) exceed a maximum number of iteration, 2) no new high confidence data, and 3) no new data label request.

The iterative application of semi-supervised learning and active learning allows conservative model assumption of the semi-supervised learning and the benefit of labeler feedback of the sampled high confidence data from active learning for the semi-supervised learning model refinement. If the sampled high confidence data is not confirmed by the labeler, the semi-supervised learning model assumption can be updated during the iteration to improve the performance. This constitutes a guided semi-supervised learning method that provides quality assurance for the effective utilization of unlabeled data.

FIG. 2 shows the processing flow of an alternative embodiment of the efficient machine learning method. An input set of labeled data 100 and unlabeled data 102 are loaded into a computer's memory. The initial supervised learning module 104 executed by a computer program of a computerized machine learning tool processes the labeled data 100 to produce a classifier 106. The labeled data 100, the unlabeled data 102, and the classifier 106 are processed by the semi-supervised learning module 108 executed by a computer program of the computerized machine learning tool to produce an updated classifier 110 which is learnt from both the labeled data 100 and the unlabeled data 102. In addition, the semi-supervised learning module 108 also identifies high confidence data 134 from the unlabeled data 102 whose label can be inferred based upon the labeled data 100 and the classifier 106. In this embodiment of the invention, the updated classifier 110 and the unlabeled data 102 are processed by the new class discovery module 200 executed by a computer program of the machine learning tool. The new class discovery module 200 identifies groups of uncertain or unusual data from the unlabeled data 102 that belong to a potential new class not included in the updated classifier 110. The new class discovery module 200 outputs the data of potential new classes 202 as well as samples of the high confidence data 134 for validation to a labeler. The labeler confirms or rejects the possibility of potential new classes and returns the labels for potential new class data 204 including the labels for the samples of the high confidence data. The new class discovery module 200 combines the labels for potential new class data 204 with the data of potential new classes 202 and sampled high confidence data to produce new class labeled data 206.

In one embodiment of the invention the new class labeled data 206 is returned to the semi-supervised learning module 108 where the cycle between the supervised learning module 108 and the new class discovery module 200 can repeat through iteration 240 until a stopping criterion is met. Afterwards, the high confidence data 134, labeled data 100, and new class labeled data 206 are processed by the supervised learning module 136 to produce an output classifier 130 and classified data 132. In one embodiment of the invention, the stopping criteria is selected from a set consisting of 1) exceed a maximum number of iteration, 2) no new high confidence data, and 3) no new data of potential new class.

The iterative application of semi-supervised learning and new class discovery allows conservative model assumption of the semi-supervised learning and the benefit of labeler feedback of the sampled high confidence data from new class discovery for the semi-supervised learning model refinement. If the sampled high confidence data is not confirmed by the labeler, the semi-supervised learning model assumption can be updated during the iteration. Furthermore, the new classes if confirmed can also change the model of the semi-supervised learning. This constitutes a guided semi-supervised learning method that provides quality assurance for the effective utilization of unlabeled data and the incorporation of new classes.

FIG. 3 shows the processing flow of a second alternative embodiment of the efficient machine learning method. An input set of labeled data 100 and unlabeled data 102 are loaded into computer memory. The initial supervised learning module 104 executed by a computer program of a computerized machine learning tool processes the labeled data 100 to produce a classifier 106. The labeled data 100, the unlabeled data 102, and the classifier 106 are processed by the semi-supervised learning module 108 executed by a computer program of the computerized machine learning tool to produce an updated classifier 110 which is learnt from both the labeled data 100 and the unlabeled data 102. In addition, the semi-supervised learning module 108 also identifies high confidence data 134 from the unlabeled data 102 whose label can be inferred based upon the labeled data 100 and the classifier 106. In this embodiment of the invention, the unlabeled data 102 and the updated classifier 110 are sent to both the active learning module 122 and the new class discovery module 200. The active learning module 122 executed by a computer program of the computerized machine learning tool identifies uncertain or unusual subset of the unlabeled data 102 as well as samples of the high confidence data 134 and requests labels from a labeler in the form of a data label request 124. The labeler determines the labels for the unlabeled data in the data label request 124 and returns the labels for requested data 126 including labels for the samples of the high confidence data. The active learning module 122 combines the labels for requested data 126 with the uncertain unlabeled data and sampled high confidence data identified in the data label request 124 to produce the augmented label data 112.

The new class discovery module 200 executed by a computer program of the computerized machine learning tool outputs the data of potential new classes 202 to a labeler. The labeler confirms or rejects the possibility of potential new classes and returns the labels for potential new class data 204. The new class discovery module 200 combines the labels for potential new class data 204 with the data of potential new classes 202 to produce new class labeled data 206.

In one embodiment of the invention, the new augmented label data 112 and the new class labeled data 206 are returned to the semi-supervised learning module 108 where the cycle between the semi-supervised learning module 108, the active learning module 122, and the new class discovery module 200 can repeat through iteration 340 until a stopping criterion is met. The high confidence data 134, the labeled data 100, the augmented label data 112, and the new class labeled data 206 are processed by the supervised learning module 136 to produce an output classifier 130 and classified data 132. In one embodiment of the invention, the stopping criteria is selected from a set consisting of 1) exceed a maximum number of iteration, 2) no new high confidence data, 3) no new data label request and 4) no new data of potential new class.

Again, the iterative application of semi-supervised learning, active learning and new class discovery allows conservative model assumption of the semi-supervised learning and the benefit of labeler feedback of the sampled high confidence data from active learning for the semi-supervised learning model refinement. If the sampled high confidence data is not confirmed by the labeler, the semi-supervised learning model assumption can be updated during the iteration. Furthermore, the new classes if confirmed can also change the model of the semi-supervised learning. This constitutes a guided semi-supervised learning method that provides quality assurance for the effective utilization of unlabeled data and the incorporation of new classes.

II. Input Data

A. Labeled Data

The labeled data 100 consists of a plurality of objects having a pairing of a label and features. The label of the data consists of a unique name or value that identifies the class the object belongs to. The features represent quantifiable or categorical information associated with the object. The labeled data can be acquired by measuring physical objects or digital representations of objects.

In one embodiment of the invention, the data are 3D microscopy images of neurons. The labels are known neuron classes such as Purkinje, Granule, and Motor neurons are used as the label in the labeled data. The features associated with each neuron can consist of measurements such as the total number of branches, the average length of the branches, and the volume of the neuron's soma. In another embodiment of the invention, the objects are images in an image database and the labels are the categories of the images such as human, cat, dog, car, boat, airplane, computer, phone, etc. A person having ordinary skill in the art should recognize that other objects and their labels suitable for pattern classification are within the scope of the current invention. For example, the object could be a movie and the label could be the type of movies such as drama, horror, science fiction, animation, documentary, etc.

B. Unlabeled Data

The unlabeled data 102 consists of a plurality of objects, each consisting of a plurality of features. The unlabeled data is different from the labeled data 100 due to its absence of known labels. The features associated with each unlabelled objects are the same as features associated with the labeled data 100.

In one embodiment of the invention, 3D microscopy images of neurons with unknown classes are the unlabeled data. In another embodiment of the invention, the objects are images in an image database with unknown categories. A person having ordinary skill in the art should recognize that other objects suitable for pattern classification are within the scope of the current invention. For example, the object could be a movie.

III. Learning Modules

III.1. Supervised Learning

Figure 4:
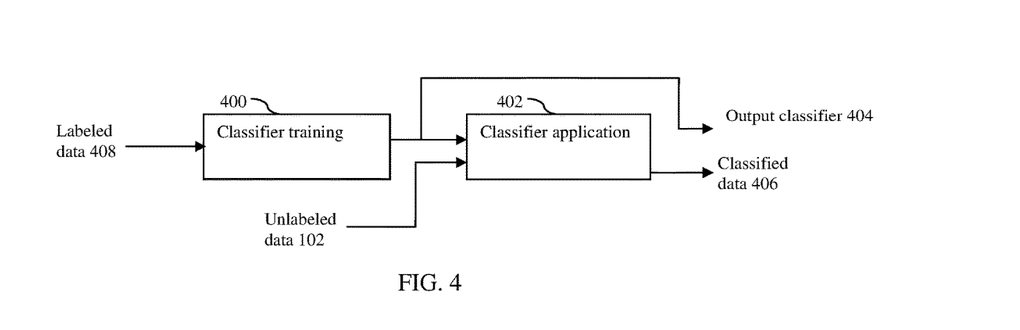
FIG. 4 shows the processing flow of a supervised learning module.

FIG. 4 shows the processing flow of the supervised learning module. The supervised learning module is applied in the initial supervised learning step 104 during the beginning of the efficient learning method. It is also applied in the supervised learning 136 step during the end of the efficient learning method. The classifier training 400 processes the labeled data 408 to generate an output classifier 404. The output classifier 404 is used in the classifier application step 402 to produce the classified data 406.

The classifier training 400 can be embodied in multiple ways. In one embodiment of the invention, the classifier training 400 generates a random forest classifier to act as the output classifier 404. In a second embodiment of the invention, the classifier training 400 generates a support vector machine (SVM) to act as the output classifier 404. In a third embodiment of the invention, the classifier training 400 generates a deep learning network. A person having ordinary skill in the art should recognize that other machine learning methods are within the scope of the current invention. For example, the classifier can be a Bayesian decision rule, nearest neighbor classifier, Kernel estimator, decision tree classifiers, etc.

A. Classifier

The classifier 106, updated classifier 110, and output classifier 130 are data structure containing rules to predict the labels from the features of objects in the unlabeled data 102. The predicted label produced by the classifiers can be in the form of a single class label or a likelihood metric representing the likelihood (or probability) that the unlabeled data belongs to at least one class. The classifiers take the form based on the training methods such as a random forest classifier, a SVM, a deep learning network, a Bayesian decision rule, a nearest neighbor classifier, Kernel estimator, decision tree classifiers, etc.

B. Classified Data

The classified data 406 consists of at least one predicted class label for each object. The predicted class label can be in the form of a single predicted label or in the form of a likelihood metric representing the likelihood (or probability) that the unlabeled data belongs to at least one class. The classified data 406 is the result of applying a classifier 404 to the unlabeled data 102.

III.2. Semi-Supervised Learning

Figure 5:
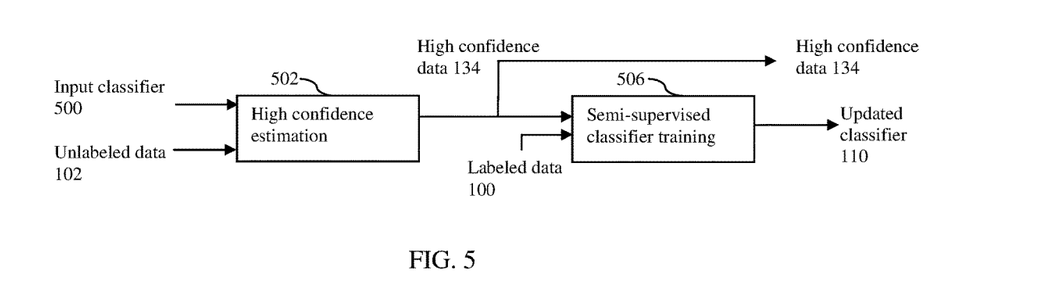
FIG. 5 shows the processing flow of a semi-supervised learning module.

Semi-supervised Learning devises ways of utilizing unlabeled data with labeled data to learn better classifiers. FIG. 5 shows the processing flow of a semi-supervised learning module 108. The high confidence estimation module 502 processes the unlabeled data 102 and selects high confidence data 134 whose label can be inferred confidently from the input classifier 500. The semi-supervised classifier training 506 combines the labeled data 100 with the high confidence data 134 to train an updated classifier 110. This processing flow can be cyclically repeated by replacing the input classifier 500 with the updated classifier 110 and removing the high confidence data from the set of unlabeled data 102. This cyclical process can repeat until some stopping criterion is reached.

In one embodiment of the invention, the input classifier 500 takes the form of a random forest and the high confidence data 134 is selected by identifying classified unlabeled data 102 whose classification takes the form of a likelihood metric. If the likelihood metric indicates that the unlabeled data strongly belongs to a class, the unlabeled data is selected as high confidence data 134. The high confidence data 134 and labeled data 100 is then used to train an updated classifier in the form of a new random forest. This process can repeat itself by replacing the input classifier 500 with the updated classifier 110 until no new high confidence data 134 is produced. A person having ordinary skill in the art should recognize that other classifier such as SVM, deep learning network, Bayesian decision rule, nearest neighbor classifier, Kernel estimator, decision tree classifiers, etc. can be used for input classifier.

A. High Confidence Estimation

Figure 6:
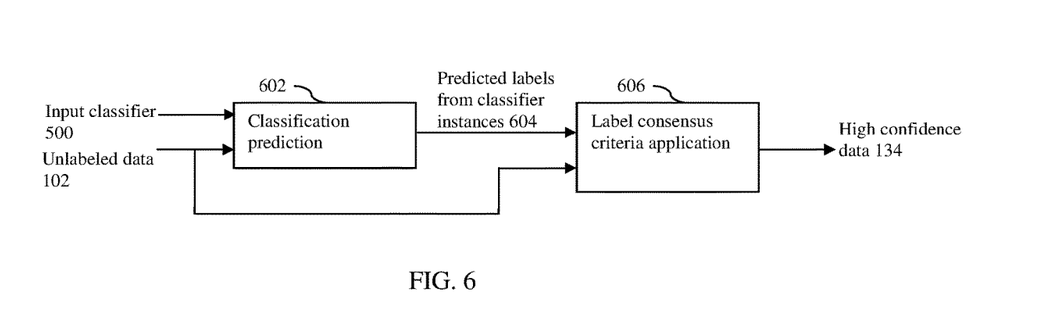
FIG. 6 shows the processing flow of the high confidence estimation module.

FIG. 6 shows the processing flow of the high confidence estimation module 502. In this embodiment, the input classifier 500 takes the form of a plurality of classifier, each capable of predicting the label for the unlabeled data 102. The classifier prediction module 602 applies the input classifier 500 to the unlabeled data 102 generating predicted labels from classifier instances 604. The predicted labels from classifier instances 604 are then processed by the label consensus criteria application module 606 to select a subset of the unlabeled data 102 as the high confidence data 134.

One method of high confidence estimation is multi-view learning. This is a general class of algorithms based on using multiple views (feature representations) of the data. The idea is to train multiple classifiers, each using a different view. Multiple classifiers must agree on the unlabeled data 102. By enforcing agreement among classifiers, we are reducing the search space. In this way, the best classifier could be found more easily with a few labeled data.

In one embodiment of this invention, the input classifier is a random forest. The random forest consists of a plurality of classification trees, each capable of classifying the unlabeled data 102. The label consensus criteria application module 606 is performed by tallying the classification result of each individual classification tree for an object to be classified. The result of this process is a total for each class, where the total is the number of trees classified an instance of the unlabeled data 102 as that class. If a total received a high percentage of the classification results for the class, the unlabeled data 102 is selected as high confidence data 134 and the class associated with the high total is assigned as the label of the object.

Figure 7:
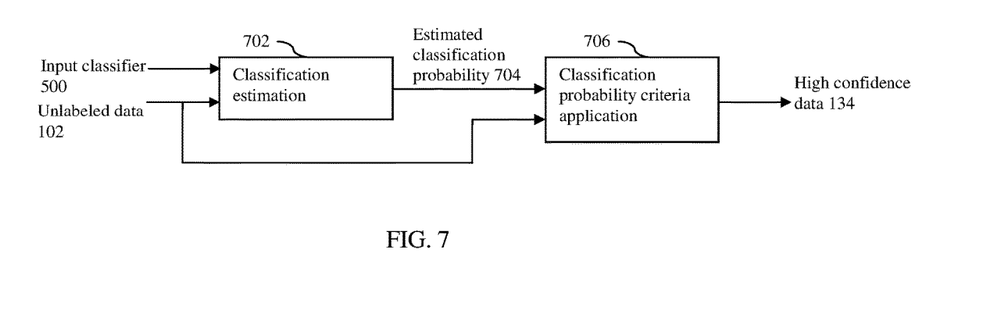
FIG. 7 shows an alternative processing flow of the high confidence estimation module.

FIG. 7 shows an alternative processing flow of the high confidence estimation module 502. The classification estimation module 702 processes the unlabeled data 102 and the input classifier 500 to produce an estimated classification probability 704. The classification probability criteria application module 706 applies a rule using the estimated classification probability 704 to select unlabeled data 102 as high confidence data 134.

In one embodiment of this invention, the input classifier is represented as a SVM. The classification estimation module 702 produces a value representing the distance from unlabeled data 102 to the separating hyperplane which is used to estimate the classification probability 704. Unlabeled data 102 close to the separating hyperplane have a lower probability of being accurately classified while unlabeled data further from the separating hyperplane have a higher probability of being accurately classified. The classification probability criteria application module 706 applies a threshold to the estimated classification probability 704 to select high confidence data 134 from the unlabeled data 102. A person having ordinary skill in the art should recognize that other classifier such as SVM, deep learning network, Bayesian decision rule, nearest neighbor classifier, Kernel estimator, decision tree classifiers, etc. can be used for input classifier.

Other methods for high confidence estimation include cluster-and-label, expectation maximization and graph regularization.

III.3. Active Learning

Figure 8:
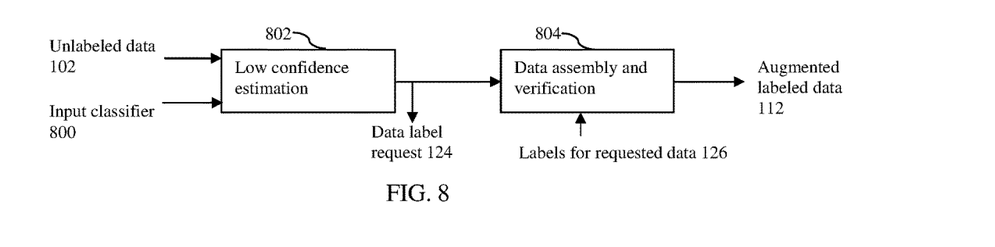
FIG. 8 shows the processing flow of an active learning module.

Active learning chooses data to be labeled. This would attain good learning performance such as classification accuracy without demanding too many labeled data. FIG. 8 shows the processing flow of an active learning module 122. The low confidence estimation module 802 processes the unlabeled data 102 and input classifier 800 to select unlabeled data 102 whose classification certainty is low. In one embodiment of the invention, the low confidence estimation module 802 is executed as the opposite of the high confidence estimation module 502. The unlabeled data 102 that is found to have low confidence is formatted into a data label request 124 to be provided to a labeler.

In one embodiment of the invention, least confidence method is used for low confidence estimation module 802. Another embodiment of the invention, smallest margin method is used for low confidence estimation module 802. In an additional embodiment of the invention entropy is used for low confidence estimation module 802.

The labeler can be an expert in the field, a group of individuals taught to recognize unlabeled data 102, or a group of algorithms trained independently from this invention or used different features if the objects. In one embodiment of the invention the data label request 124 takes the form of a neuron whose class cannot be easily classified based upon the known classes and the features of the labeled data 100. After consideration, the labeler provides the labels for the requested data 126. The data assembly and verification step 804 combines the features from the data label request 124 with the labels for the requested data 126 to produce the augmented labeled data 112.

III.4. New Class Discovery

Figure 9:
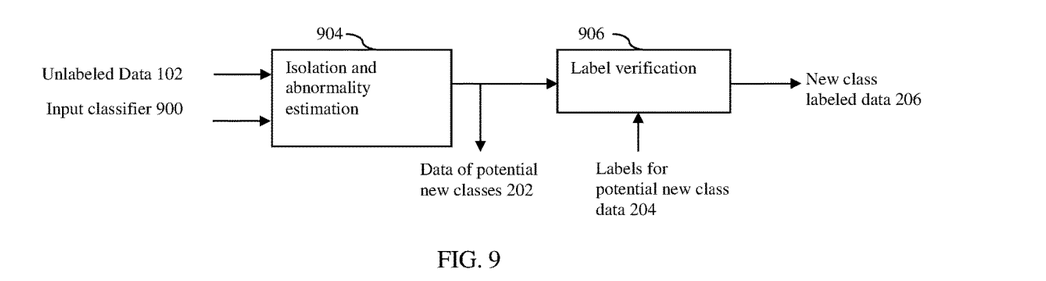
FIG. 9 shows the processing flow of the new class discovery module.

FIG. 9 shows the processing flow of the new class discovery module 200. The new class discovery module 200 performs the isolation and abnormality estimation module 904 on the unlabeled data 102 utilizing the input classifier 900. The data of potential new classes 202 is unlabeled data 102 found to be isolated or abnormal by the isolation and abnormality estimation module 904. The data of potential new classes 202 is given to a labeler. The labeler can be an expert in the field, a group of individuals taught to recognize unlabeled data 102, or a group of algorithms trained independently using different features of the objects. In one embodiment the data of potential new classes 202 takes the form of a neuron whose class cannot be easily classified based upon the known classes and the features of the labeled data. The labeler can confirm or deny the existence of a new class or assign an existing class to the abnormal unlabeled data 102. The labels for potential new class data 204 is combined with the features from the data of potential new classes 202 to be processed by the label verification module 906 and produce the new class labeled data 206.

In one embodiment of the invention, the input classifier 900 is paired with a clustering method applied to all labeled data 100 and unlabeled data 102. A cluster can consist of labeled data 100, unlabeled data 102, or a mixture of labeled and unlabeled data. Clusters consisting only of low confidence, unlabeled data 102 are identified as isolated and abnormal data. One or more representative unlabeled data are selected from such clusters and are given to the labeler for confirmation.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A computerized efficient machine learning method for classification of data, comprising the steps of:
   a) inputting labeled data and unlabeled data into a computer memory;
   b) performing by a computer program of a computerized machine learning tool an initial supervised learning using the labeled data to generate a classifier;
   c) performing by a computer program of the computerized machine learning tool a semi-supervised learning guided by a model assumption using the labeled data, the classifier and the unlabeled data to generate an updated classifier and high confidence data;
   d) after step c), performing by a computer program of the computerized machine learning tool an active learning using the updated classifier and the unlabeled data to generate a data label request and receive labels for requested data to label a subset of the unlabeled data and generate augmented labeled data containing labels for high confidence data to update the model assumption for semi-supervised learning if the high confidence data is not verified by the labels for high confidence data, wherein the data label request is processed by an external labeler to generate the labels for requested data; and
   e) performing by a computer program of the computerized machine learning tool a supervised learning using the high confidence data, the labeled data and the augmented labeled data to generate an output classifier.

2. The computerized efficient machine learning method of claim 1, further comprising the steps of:
   f) performing another iteration of semi-supervised learning guided by model assumption using the labeled data, the augmented labeled data, the output classifier and remaining unlabeled data to generate a new updated classifier and a new set of high confidence data;
   g) after step f), performing another iteration of active learning using the new updated classifier from step f) and the remaining unlabeled data to generate a new data label request and receive a new corresponding set of labels for requested data to generate a new set of augmented labeled data containing labels for high confidence data to update the model assumption for semi-supervised learning if the high confidence data is not verified by the labels for high confidence data;
   h) performing another iteration of supervised learning using the new set of high confidence data from step f), the labeled data and the new set of augmented labeled data from step g) to generate a new output classifier; and
   i) repeating steps f), g) and h) until a stopping criteria is reached, wherein for the repeated step f), the new set of augmented labeled data from step g) is used as the augmented labeled data and the new output classifier from step h) is used as the output classifier.

3. The computerized efficient machine learning method of claim 1, wherein the supervised learning further outputs classified data.

4. The computerized efficient machine learning method of claim 1, wherein the semi-supervised learning comprises the steps of:
   c1) inputting an input classifier into a computer memory;
   c2) performing by a computer program of the computerized machine learning tool a high confidence estimation using the input classifier and the unlabeled data to generate high confidence data output; and
   c3) performing a semi-supervised classifier training using the high confidence data and the labeled data to generate the updated classifier.

5. The computerized efficient machine learning method of claim 1, wherein the active learning comprises the steps of:
   d1) inputting an input classifier into a computer memory;
   d2) performing by a computer program of the computerized machine learning tool a low confidence estimation using the input classifier and the unlabeled data to generate the data label request; and d3) performing a data assembly and verification using the labels for requested data to generate the augmented labeled data.

6. The computerized efficient machine learning method of claim 2, wherein the stopping criteria is selected from a group consisting of 1) exceed a maximum number of iterations, 2) no new high confidence data, and 3) no new data label request.

7. The computerized efficient machine learning method of claim 4, wherein the high confidence estimation of the semi-supervised learning comprises the steps of:
performing by a computer program of the computerized machine learning tool a classification prediction using the input classifier and the unlabeled data to generate predicted labels from classifier instances; and
performing a label consensus criteria application using the predicted labels from classifier instances and the unlabeled data to generate the high confidence data output.

8. The computerized efficient machine learning method of claim 4, wherein the high confidence estimation in the semi-supervised learning comprises the steps of:
performing by a computer program of the computerized machine learning tool a classification estimation using the input classifier and the unlabeled data to generate an estimated classification probability output; and
performing a classification probability criteria application using the estimated classification probability and the unlabeled data to generate the high confidence data output.

9. A computerized efficient machine learning method for classification of data and new class discovery, comprising the steps of:
a) inputting labeled data and unlabeled data into a computer memory;
b) performing by a computer program of a computerized machine learning tool an initial supervised learning using the labeled data to generate a classifier;
c) performing by a computer program of the computerized machine learning tool a semi-supervised learning guided by a model assumption using the labeled data, the classifier and the unlabeled data to generate an updated classifier and high confidence data;
d) after step c), performing by a computer program of the computerized machine learning tool a new class discovery using the updated classifier and the unlabeled data to generate data of potential new classes and receive labels for potential new class data to label a subset of the unlabeled data and generate new class labeled data containing labels for high confidence data to update the model assumption for semi-supervised learning if the high confidence data is not verified by the labels for high confidence data, wherein the data of potential new classes is processed by an external labeler to generate the labels for potential new class data; and
e) performing by a computer program in the computerized machine learning tool a supervised learning using the high confidence data, the labeled data and the new class labeled data to generate an output classifier.

10. The computerized efficient machine learning method of claim 9, further comprising the steps of:
f) performing another iteration of semi-supervised learning guided by model assumption using the labeled data, the new class labeled data, the output classifier and remaining unlabeled data to generate a new updated classifier and a new set of high confidence data;
g) after step f), performing another iteration of new class discovery using the new updated classifier from step f) and the remaining unlabeled data to generate a new set of data of potential new classes and receive a new corresponding set of labels for potential new class data to generate a new set of new class labeled data containing labels for high confidence data to update the model assumption for semi-supervised learning if the high confidence data is not verified by the labels for high confidence data;
h) performing another iteration of supervised learning using the new set of high confidence data from step f), the labeled data and the new set of new class labeled data from step g) to generate a new output classifier; and
i) repeating steps f), g) and h) until a stopping criteria is reached, wherein for the repeated step f), the new set of new class labeled data from step g) is used as the new class labeled data and the new output classifier from step h) is used as the output classifier.

11. The computerized efficient machine learning method of claim 9, wherein the supervised learning further outputs classified data.

12. The computerized efficient machine learning method of claim 9, wherein the semi-supervised learning comprises the steps of:
c1) inputting an input classifier into a computer memory;
c2) performing by a computer program of the computerized machine learning tool a high confidence estimation using the input classifier and the unlabeled data to generate high confidence data output; and
c3) performing a semi-supervised classifier training using the high confidence data and the labeled data to generate the updated classifier.

13. The computerized efficient machine learning method of claim 9, wherein the new class discovery comprises the steps of:
d1) inputting an input classifier into a computer memory;
d2) performing by a computer program of the computerized machine learning tool an isolation and abnormality estimation using the input classifier and the unlabeled data to generate the data of potential new class; and
d3) performing a label verification using the labels for potential new class data to generate the new class labeled data.

14. The computerized efficient machine learning method of claim 10, wherein the stopping criteria is selected from a group consisting of 1) exceed a maximum number of iteration, 2) no new high confidence data, and 3) no new data of potential new class.

15. The computerized efficient machine learning method of claim 12, wherein the high confidence estimation of the semi-supervised learning comprises the steps of:
performing by a computer program of the computerized machine learning tool a classification prediction using the input classifier and the unlabeled data to generate predicted labels from classifier instances; and
performing a label consensus criteria application using the predicted labels from classifier instances and the unlabeled data to generate the high confidence data output.

16. The computerized efficient machine learning method of claim 12, wherein the high confidence estimation of the semi-supervised learning comprises the steps of:
performing by a computer program of the computerized machine learning tool a classification estimation using the input classifier and the unlabeled data to generate an estimated classification probability output; and performing a classification probability criteria application using the estimated classification probability and the unlabeled data to generate the high confidence data output.

17. A computerized efficient machine learning method for classification of data and new class discovery, comprising the steps of:
   a) inputting labeled data and unlabeled data into a computer memory;
   b) performing by a computer program of a computerized machine learning tool an initial supervised learning using the labeled data to generate a classifier;
   c) performing by a computer program of the computerized machine learning tool a semi-supervised learning guided by a model assumption using the labeled data, the classifier and the unlabeled data to generate an updated classifier and high confidence data;
   d) after step c), performing by a computer program of the computerized machine learning tool an active learning using the updated classifier and the unlabeled data to generate a data label request and receive labels for requested data to label a subset of the unlabeled data and generate augmented labeled data containing labels for high confidence data to update the model assumption for semi-supervised learning if the high confidence data is not verified by the labels for high confidence data, wherein the data label request is processed by an external labeler to generate the labels for requested data;
   e) after step c), performing by a computer program of the computerized machine learning tool a new class discovery using the updated classifier and the unlabeled data to generate data of potential new classes and receive labels for potential new class data to generate new class labeled data containing labels for high confidence data to update the model assumption for semi-supervised learning if the high confidence data is not verified by the labels for high confidence data, wherein the data of potential new classes is processed by an external labeler to generate the labels for potential new class data; and
   f) performing by a computer program of the computerized machine learning tool a supervised learning using the high confidence data, the labeled data, the new class labeled data and the augmented labeled data to generate an output classifier.

18. The computerized efficient machine learning method of claim 17, further comprising the steps of:
   g) performing another iteration of semi-supervised learning guided by model assumption using the labeled data, the new class labeled data, the output classifier and remaining unlabeled data to generate another iteration of updated classifier and another iteration of high confidence data; and
   h) after step g), performing another iteration of active learning using new iteration of updated classifier and the remaining unlabeled data to generate another iteration of data label request and receive another iteration of labels for requested data to generate another iteration of augmented labeled data containing labels for high confidence data to update the model assumption for semi-supervised learning if the high confidence data is not verified by the labels for high confidence data; and
   i) after step g), performing another iteration of new class discovery using new iteration of updated classifier and new iteration of unlabeled data to generate another iteration of data of potential new classes and receive another iteration of labels for potential new class data to generate another iteration of new class labeled data containing labels for high confidence data to update the model assumption for semi-supervised learning if the high confidence data is not verified by the labels for high confidence data; and
   j) performing another iteration of supervised learning using another iteration of high confidence data and another iteration of the new class labeled data and augmented labeled data to generate another iteration of output classifier; and
   k) repeating above steps g) through (j) until a stopping criteria is reached.

19. The computerized efficient machine learning method of claim 17, wherein the supervised learning further outputs classified data.

20. The computerized efficient machine learning method of claim 17, wherein the semi-supervised learning comprises the steps of:
   c1) inputting an input classifier into a computer memory;
   c2) performing by a computer program of the computerized machine learning tool a high confidence estimation using the input classifier and the unlabeled data to generate a high confidence data output; and
   c3) performing a semi-supervised classifier training using the high confidence data and the labeled data to generate the updated classifier.

21. The computerized efficient machine learning method of claim 17, wherein the active learning comprises the steps of:
   d1) inputting an input classifier into a computer memory;
   d2) performing by a computer program of the computerized machine learning tool a low confidence estimation using the input classifier and the unlabeled data to generate the data label request; and
   d3) performing a data assembly and verification using the new class labeled data to generate the augmented labeled data.

22. The computerized efficient machine learning method of claim 17, wherein the new class discovery comprises the steps of:
   e1) inputting an input classifier into a computer memory;
   e2) performing by a computer program of the computerized machine learning tool an isolation and abnormality estimation using the input classifier and the data label request to generate the data of potential new classes; and
   e3) performing a label verification using the labels for potential new class data to generate the new class labeled data.

23. The computerized efficient machine learning method of claim 18, wherein the stopping criteria is selected from a group consisting of 1) exceed a maximum number of iteration, 2) no new high confidence data, 3) no new data label request and 4) no new data of potential new class.

24. The computerized efficient machine learning method of claim 20, wherein the high confidence estimation of the semi-supervised learning comprises the steps of:
   performing by a computer program of the computerized machine learning tool a classification prediction using the input classifier and the unlabeled data to generate predicted labels from classifier instances; and
   performing a label consensus criteria application using the predicted labels from classifier instances and the unlabeled data to generate the high confidence data output.

25. The computerized efficient machine learning method of claim 20, wherein the high confidence estimation of the semi-supervised learning comprises the steps of:
- performing by a computer program of the computerized machine learning tool a classification estimation using the input classifier and the unlabeled data to generate an estimated classification probability output; and
- performing a classification probability criteria application using the estimated classification probability and the unlabeled data to generate the high confidence data output.

* * * * *